Figure 1:
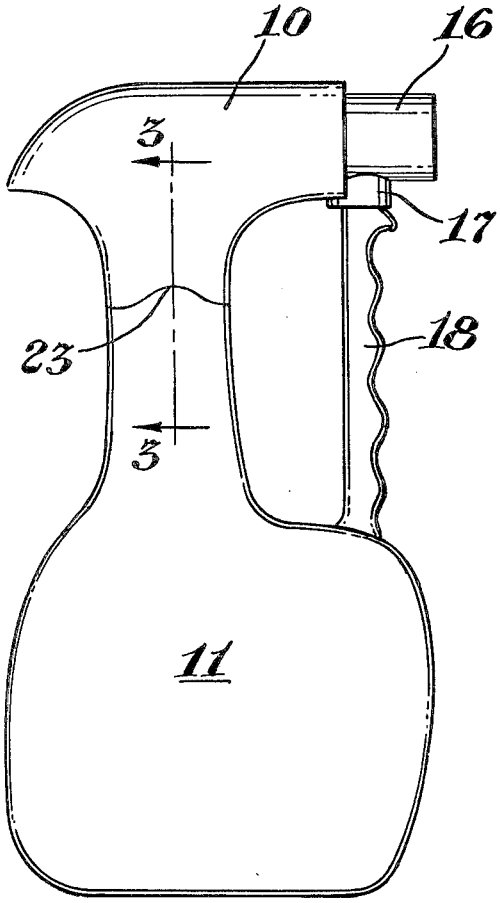
Figure 3:
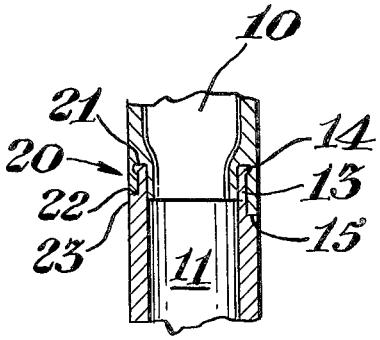
Figure 2:
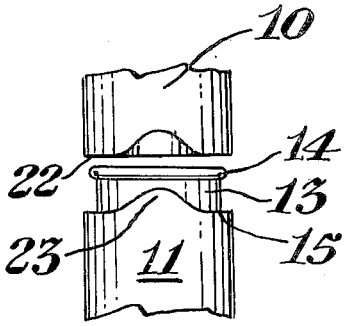
Figure 4:
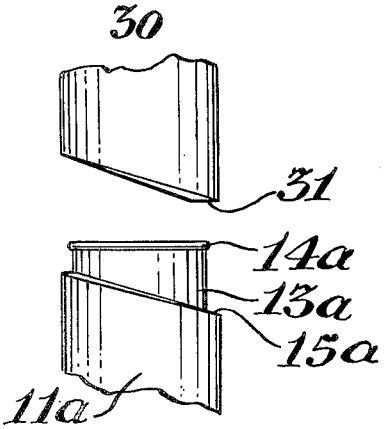
Figure 5:
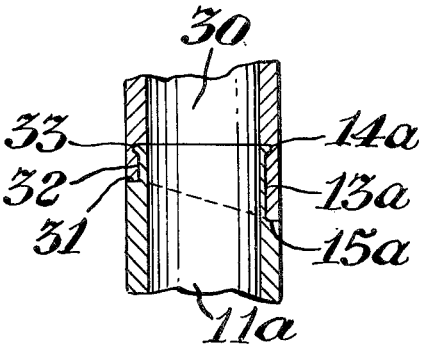

United States Defensive Publication [19] (H) [11] T990,003

Sweeney [43] Jan. 1, 1980

[54] DISPENSER

[76] Inventor: George A. Sweeney, 404 Rollcrest Ct., Midland, Mich. 48640

[21] Appl. No.: 47,406

[22] Filed: Jun. 11, 1979

[51] Int. Cl.[2] ..... B05B 9/043

[52] U.S. Cl. ..... 222/383

[57] ABSTRACT

A manually operated dispensing pump is connected to a container by a suitable friction or snap-fit mechanism which includes self-orienting camming surfaces that cooperate to disconnect the pump from the container upon rotation of one relative to the other.

7 Claims, 1 Sheet Drawing,

11 Pages Specification

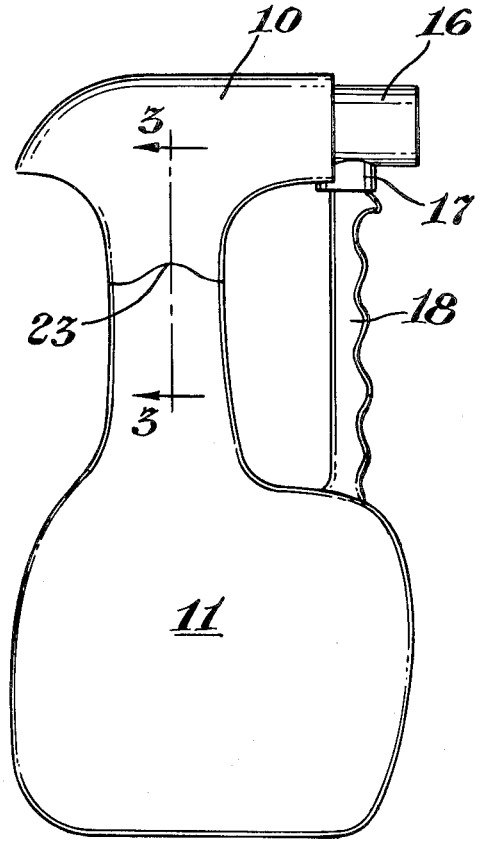

The file of this unexamined application may be inspected and copies thereof may be purchased (849 O.G. 1221, Apr. 9, 1968).